United States Patent
Mayer

(10) Patent No.: US 11,249,302 B2
(45) Date of Patent: Feb. 15, 2022

(54) OPTO-ELECTRO-MECHANICAL BEAM MANIPULATION SYSTEM

(71) Applicant: HEXAGON TECHNOLOGY CENTER GMBH, Heerbrugg (CH)

(72) Inventor: Tim Mayer, Horn (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 164 days.

(21) Appl. No.: 16/586,227

(22) Filed: Sep. 27, 2019

(65) Prior Publication Data

US 2020/0103644 A1 Apr. 2, 2020

(30) Foreign Application Priority Data

Sep. 28, 2018 (EP) .................................... 18197799

(51) Int. Cl.
   G02B 26/08 (2006.01)
   G02B 26/10 (2006.01)
   G02B 26/02 (2006.01)

(52) U.S. Cl.
   CPC ........... *G02B 26/105* (2013.01); *G02B 26/02* (2013.01); *G02B 26/0883* (2013.01); *G02B 26/0858* (2013.01); *G02B 26/0866* (2013.01)

(58) Field of Classification Search
   CPC .. G02B 26/105; G02B 26/02; G02B 26/0883; G02B 26/0858; G02B 26/0866; G02B 26/085; G01B 11/24; G01B 11/00; G01B 11/02; B23K 26/362
   USPC ..................................................... 359/223.1
   See application file for complete search history.

(56) References Cited

U.S. PATENT DOCUMENTS

| | | | |
|---|---|---|---|
| 4,421,381 A | 12/1983 | Ueda et al. | |
| 6,330,523 B1 | 12/2001 | Kacyra et al. | |
| 7,220,009 B2 * | 5/2007 | Shimada | G02B 26/0841 |
| | | | 359/199.1 |
| 2007/0149039 A1 | 6/2007 | Wu | |
| 2007/0279720 A1 | 12/2007 | Torashima et al. | |

(Continued)

FOREIGN PATENT DOCUMENTS

| | | |
|---|---|---|
| CN | 101320129 A | 12/2008 |
| CN | 100514116 C | 7/2009 |
| CN | 104634312 A | 5/2015 |

OTHER PUBLICATIONS

Search Report in EP Application No. 18197799.2 dated Nov. 26, 2018.

*Primary Examiner* — Euncha P Cherry
(74) *Attorney, Agent, or Firm* — Maschoff Brennan

(57) ABSTRACT

An opto-electro-mechanical system for manipulating optical radiation comprising a rotationally or translationally movable element, wherein the element is itself an optical element or comprises an optical element. Furthermore the system comprises a stator for the movable element having a recess enabling a deflection range, a flexible connection between the stator and the movable element providing a corresponding kinematically defined mobility, and an actuator for deflecting the movable element, wherein the stator is connected as one piece to the movable element, and the one-piece connection consists of silicate glass- and the recess is arranged around the movable element in such a way that the movable element is deflectable in accordance with the kinematically defined mobility with elastic deformation of the connection by means of the actuator.

14 Claims, 2 Drawing Sheets

(56) References Cited

U.S. PATENT DOCUMENTS

| | | |
|---|---|---|
| 2008/0304124 A1 | 12/2008 | Yoda |
| 2012/0257268 A1 | 10/2012 | Hino et al. |
| 2014/0285905 A1* | 9/2014 | Zhou .................. G02B 15/00 359/696 |
| 2015/0177508 A1 | 6/2015 | Laabs et al. |
| 2016/0116732 A1 | 4/2016 | Yasuda |
| 2018/0017783 A1 | 1/2018 | Ji et al. |

* cited by examiner

OPTO-ELECTRO-MECHANICAL BEAM MANIPULATION SYSTEM

CROSS-REFERENCE TO RELATED APPLICATIONS

This application claims priority to European Patent Application No. 18197799 filed on Sep. 28, 2018, which is incorporated herein by reference.

FIELD OF THE INVENTION

The invention relates to an opto-electro-mechanical system for manipulating optical radiation. The invention also relates to an optical scanner, which deflects measurement radiation by means of the opto-electro-mechanical system.

BACKGROUND

Opto-electro-mechanical beam manipulation systems achieve a deflection or deformation of an optical beam by means of an optical element in that the optical element is deflected rotationally, translationally, or in a combined type of rotation and translation, quasi-statically, dynamically, or resonantly around a zero position. In the case of the quasi-static deflection, a specific deflection position is approached and held. In the case of the dynamic deflection, the optical element oscillates or moves continuously around the zero position and in the case of the resonant deflection, the optical element oscillates at a resonant frequency around the zero position. Independently of the type of the deflection, the mechanical structure is based on the principle that the optical element, which is deflected quasi-statically, dynamically, or in resonance, is connected via corresponding spring elements to a frame or stator. The spring elements simultaneously provide the reproducible and practically hysteresis-free rotational or translational mobility in this case. The spring element is designed differently depending on the type of deflection. Torsion spring elements are typically used to provide a rotational mobility and linear spring elements or leaf spring elements are used to provide a translational mobility. The corresponding spring elements have function-defining constructive and spring-material-specific features, so that the spring element elastically deforms reversibly upon the deflection of the optical element. Because of the flexible connection and its deformation characteristic, the optical element can accordingly be deflected quasi-statically, dynamically, or resonantly by means of a suitable actuator. The actuator is adapted in this case to the opto-electro-mechanical beam manipulation system and effectuates the deflection, for example, based on electromagnetic, electrostatic, piezoelectric, or also thermoelectric operating principles. In particular, the selection of the corresponding actuator is dependent on the geometric formation and the mass of the optical element to be deflected, the spring element deformation characteristic, the deflection dynamics to be achieved, and the corresponding deflection range. Therefore, for a large part of the applications in which such an opto-electro-mechanical beam manipulation system is used, characteristic variables are decisive, for example, the maximum deflection range, the maximum oscillating frequency, the size of an active surface of the optical element, a minimal power consumption, and thermal stability range.

On the part of the production, for example, the requirements for the reproducibility, accuracy, and ability to integrate the beam manipulator, but also the cost-effectiveness, determine the selection of the suitable production process.

A plurality of possible opto-electro-mechanical beam manipulation systems is known from the prior art, wherein the group of the opto-electro-mechanical scanner systems is characterized in that the optical element for beam deflection is predominantly a mirror, a prism, or a lens.

In the field of laser-based surveying technology, corresponding surveying devices, for example, total stations or theodolites, for accurately surveying geodetic target points, are equipped with a scanner unit. In the scanner unit, by means of a corresponding opto-electro-mechanical beam manipulation system, the measurement radiation generated by a laser source is deflected in a controlled manner either in the direction of the geodetic target point to be surveyed or scanned over a defined field of view range limited by the maximum possible deflection of the optical element. A part of the measurement radiation is reflected from the geodetic target point back to the surveying device and the distance to the geodetic target point is ascertained based thereon interferometrically or by means of runtime measurement. The spatial coordinates of the geodetic target point are determinable using the corresponding information about the angle at which the geodetic target point is targeted by the laser beam.

A further area of surveying technology relates to the digital acquisition or surveying of objects or of surfaces by means of a method, in which an optical scanner having a determined spatial location scans the corresponding object or the corresponding surface using a light beam or laser beam and the spatial position of a targeted surface point is acquired based on the radiation reflected from the object or the surface. The ascertainment of the three-dimensional coordinate information of the surface points is performed similarly to that of the geodetic target points. In this manner, the three-dimensional coordinate information of a plurality of surface points can be ascertained in minutes or seconds and thus an object or a surface can be digitally acquired. Typical surveying tasks result therefrom, for example, the digital acquisition of industrial facilities, construction site terrains, house façades, historical buildings, accident locations, and crime scenes, but also of vehicle bodies, aircraft fuselages, interiors, and components. Furthermore, such an object or surface acquisition can be used to produce map information or to navigate unmanned vehicles or flying objects.

Both in surveying devices having a scanner unit and also in the optical scanners alone, laser pulses or light pulses are emitted via a rapidly settable optical element of an opto-electro-mechanical beam manipulation system according to a defined scanning grid to the surface. Specified by the corresponding application, specific requirements exist for the angle range in which the radiation can be deflected and the speed and accuracy at which corresponding angular positions can be departed or approached.

SUMMARY

It is an object of some embodiments the present invention to provide an opto-electro-mechanical beam manipulation system, which is improved with respect to functionality and simplified with respect to complexity, for use in laser-beam-based and/or light-beam-based scanners or scanner units.

Some aspects of the invention is based on the concept of providing a beam manipulation system having improved deflection dynamics and more robust construction than beam manipulation systems of the type in question, as are typically used in scanner units of surveying devices or a scanner alone.

This object is achieved by the implementation of the characterizing features of the independent claim. Features which refine the invention in an alternative or advantageous manner can be inferred from the dependent patent claims.

Some aspects of the invention relate to an opto-electro-mechanical system for manipulating optical radiation comprising a rotationally or translationally movable element, wherein the element itself is an optical element or comprises an optical element. Furthermore, the system comprises a stator for the movable element having a recess enabling a deflection range, a flexible connection between the stator and the movable element providing a corresponding kinematically defined mobility, and an actuator for deflecting the movable element, wherein the stator is connected in one piece to the movable element, and the one-piece connection consists of silicate glass, in particular quartz glass, and the recess is arranged around the movable element in such a way that the movable element is deflectable by means of the actuator in accordance with the kinematically defined mobility with elastic deformation of the connection.

In particular quartz glass is distinguished by a high theoretical yield stress and/or tensile strength. These theoretical values are typically not reached in the application, since the deformation behavior under mechanical load in use is determined by extrinsic factors, primarily by surface defects which are introduced into the material during the manufacturing of corresponding components. Because of the atomic bond structure and the microstructure, the material cannot counteract a propagating defect, for example, by way of plastic deformation, which is displayed in very low toughness values of the material. Furthermore, quartz glass has a low coefficient of thermal expansion and high chemical resistance. Because of the theoretical, mechanical, and thermal properties, quartz glass is suitable as a flexible connection material if it comprises corresponding defect-free connection surfaces.

To be able to use these properties at least approximately in a corresponding component manufactured from quartz glass, it is advantageous to produce the component in one piece using a method which provides defect-free surfaces on the component. Such a method, similar to a 3D-printing process, is based on the local modification of regions of a quartz glass blank by means of focused laser radiation and subsequent chemical etching away of glass regions previously subjected to the focused laser radiation. Surfaces produced by this laser-based etching method have a very low defect density and are also suitable for coating, in particular with metallic layers or layer sequences. Furthermore, the 3D-printing-like process is sufficiently flexible to also produce desired geometries macroscopically, for example, as in the present invention, to provide large surfaces/active surfaces/mirrored surfaces of the movable element, which support a correspondingly large optical element or receive a corresponding large-area mirror coating. The process also permits the production of optical active surfaces on an element, whereby the element itself is formed as a lens, for example. A further advantage of the method is the option of shaping flexible, elastically deforming connections, in particular corresponding connection cross sections. In particular in the case of flexible connections which elastically twist under force action, a homogeneous distribution of the mechanical tensions in the connection volume enables improved dynamic behavior under alternating torsion loads. In this case, a round connection cross section results in more homogeneous tension distributions than a cross section having corners or peaks. The production process offers a further advantage in that the size of corresponding deflection ranges is settable with respect to the opto-electro-mechanical beam manipulation system.

An opto-electro-mechanical beam manipulation system manufactured according to this method offers high thermal stability because of the one-piece nature, since as a result of the one, low coefficient of thermal expansion of the one-piece component, only minor thermal tensions occur.

The manipulation of optical radiation can relate to both a beam shaping and also a beam-deflecting action, which can be achieved using corresponding optical elements either in transmission or reflection. For example, lenses, prisms, or mirrors can be used as optical elements, wherein the lens, the prism, or the mirror achieves either a beam shaping or beam-deflecting effect in accordance with the respective formation.

A kinematically defined mobility can describe a rotation, a translation, or an arbitrary combination of rotation and translation of the movable element. In this case, the mobility can comprise up to six degrees of freedom, three rotational and three translational degrees of freedom. Furthermore, the kinematically defined mobility can describe the dynamics with which a specific movement/deflection of the movable element is executed, for example, relating to the speed, acceleration, or frequency and thus can describe a quasi-static, dynamic, or resonant movement/deflection. The kinematically defined mobility can also describe a sequence of different quasi-static, dynamic, and resonant movement patterns.

Some aspects of the invention also relate to an optical scanner for surveying surfaces, comprising a radiation source for emitting optical measurement radiation, an opto-electro-mechanical beam manipulation system according to the above-mentioned exemplary embodiment, and a detector for detecting at least parts of the measurement radiation reflected from the surface to be surveyed. In this case, the opto-electro-mechanical beam manipulation system comprises a deflection extent encoder for determining the deflection extent of the movable element, and the optical measurement radiation is deflected by means of the opto-electro-mechanical beam manipulation system in the direction of the surface to be surveyed in such a way that the surface to be surveyed is scanned by the measurement radiation by means of the rotationally or translationally movable element in accordance with the kinematically defined mobility, and a part of the reflected measurement radiation is detected using the detector and, based thereon and on the determined deflection extent of the movable element, the scanned surface is surveyed.

The radiation source can be, for example, a laser diode for emitting distance measurement radiation, wherein the emitted distance measurement radiation is deflectable by means of the opto-electro-mechanical beam deflection system, in particular in a defined vertical field of view range. In particular, the distance measurement radiation generated by the radiation source is pulsed laser radiation. Furthermore, the deflection extent can contain, for example, an item of angle information, a distance/translational deflection, or a combination thereof, each in relation to a zero position of the movable element.

During the surveying of a surface, a plurality of surface points is surveyed. The coordinate information of a surface point can be ascertained in this case via the distance to the surface point and a corresponding item of angle information, which comprises the angle at which the surface point is targeted. This item of angle information can be ascertained from the deflection extent or by means of further angle or deflection extent encoders. The distance can be ascertained based on a part of the reflected radiation in accordance with the principle of triangulation, interferometry, or runtime measurement.

In one specific embodiment of the optical scanner, the movable element for beam deflection can comprise a mirror, or the movable element itself can be a prism or a lens. For example, the movable element can be coated using a layer or layer sequence which reflect optical radiation. In particular, the coating can comprise at least one of the elements of: gold, aluminum, and silver.

According to one specific embodiment of the optical scanner, the flexible connection can provide a rotational mobility, define a torsion axis, be formed rod-shaped, and elastically deform under torsion, and the actuator can rotationally deflect the movable element in accordance with the kinematically defined mobility. The movable element can thus be rotationally deflected around the torsion axis, wherein the flexible connection twists and a functionality comparable to that of a torsion spring element is provided.

In a further specific embodiment of the optical scanner, the opto-electro-mechanical beam manipulation system can comprise a further stator in relation to the one stator having a further recess enabling a further deflection range, a further flexible connection between the further stator and the one stator providing a corresponding kinematically defined rotational mobility of the one stator, and a further actuator for the rotational deflection of the one stator, corresponding to the kinematically defined mobility, with elastic deformation of the further connection. In this case, the further stator is connected in one piece to the one stator and the one-piece connection consists of silicate glass, in particular quartz glass, and the further flexible connection for providing a kinematically defined rotational mobility of the one stator defines a further torsion axis perpendicular to the one torsion axis, is formed rod-shaped, and elastically deforms under torsion, so that the mobility of the movable element comprises two rotational degrees of freedom. If the opto-electro-mechanical beam manipulation system comprises two stators, for example, the one stator, which is connected in one piece to the movable element, fulfills its static functionality with respect to the movable element. However, the one stator is not static in relation to the further stator, but rather is movable with respect to the further stator. Therefore, the further stator fulfills its static functionality with respect to the one stator. In this manner, the opto-electro-mechanical beam manipulation system can comprise further stators, actuators, and connections, so that a mobility of the movable element in six degrees of freedom, three rotational and three translational degrees of freedom, is enabled.

In one specific embodiment of the optical scanner, the rod-shaped flexible connection can have a rounded, in particular circular or oval, rod cross section. In this case, a surface normal of the cross-sectional area can point in the direction of the rod longitudinal direction. The rounded, in particular circular or oval, connection cross section, i.e., a cross section without corners or peaks, results in a homogeneous tension distribution in the bond volume. The homogeneous tension distribution, the defect-free bond surface, and the intrinsic mechanical properties of the silicate glass thus usable enable in this case achieving high deflection amplitudes with minimal deflection force application. In the present configuration, this is primarily to be attributed to the low damping properties of the combination of the construction with the material silicate glass, in particular quartz glass. Furthermore, the optimized connection cross section in combination with the usable intrinsic mechanical properties of the silicate glass permits higher oscillating frequencies to be achieved while simultaneously taking into consideration the provision of the largest possible surface/active surface/mirror surface of the corresponding movable element.

According to a further specific embodiment of the opto-electro-mechanical beam manipulation system or the optical scanner, an actuator comprises a first actuator element, in particular a magnet (or comparable element), and a second actuator element, in particular a coil (or comparable element), and deflects the movable element based on an interaction of the actuator elements according to one of the action principles of: electromagnetism, electrostatics, piezoelectricity, and thermoelectrics. A part of an actuator element can be located in this case on the movable element or on the movable stator. The scanner can also comprise a regulating actuator for each actuator, which regulates the deflection of the movable element as part of a control loop and compensates, for example, for changing resonant frequencies because of temperature changes.

In a further specific embodiment of the opto-electro-mechanical beam manipulation system or the optical scanner, the first actuator element can be a permanent magnet and the second actuator element can be a coil. In this case, the permanent magnet can be excited by means of a changing magnetic field, wherein a quasi-static or chronologically periodically changing current curve is applied to the coil for the excitation and thus a corresponding quasi-stationary magnetic field or periodically changing magnetic field is generated.

According to a further specific embodiment of the opto-electro-mechanical beam manipulation system or the optical scanner, it can comprise at least parts of an actuator element as a structured coating. A structured coating can be, for example, a magnetic surface or a conductor track structure. Such a coating can be implemented in particular by means of a lithographic vapor phase deposition process, screen printing process, or 3D-printing process.

According to one specific embodiment of the opto-electro-mechanical beam manipulation system, it comprises a lens, a prism, or a mirror as a movable element, wherein a beam deflection capability or beam shaping capability is provided in accordance with a formation of the lens, the prism, or the mirror.

For example, the movable element can be formed as a lens having two opposing active surfaces, wherein the recess is arranged around the lens so that both active surfaces are in large part exposed to the outside. Optical radiation can thus be incident on the lens surface from both sides and/or exit from both sides, wherein the beam passes through the optical element and the beam is deflected. The optical element can thus be used in transmission. The lens can have a beam shaping or beam-deflecting effect on the optical radiation in this case. A prism can also be used in the same manner. A mirror can comprise, for example, a curved mirror surface, whereby it has a beam shaping effect on the optical radiation.

According to a further embodiment of the beam manipulation system, the movable element can be a lens, wherein the lens is part of an Alvarez lens. In this case, the one half of the Alvarez lens can be deflected in relation to the other half by means of the actuator in accordance with the kinematically defined mobility.

In a further specific embodiment of the optical scanner, the deflection extent encoder can be an optical deflection extent encoder having a radiation source, for emitting optical deflection measurement radiation, and a position-sensitive detector in such a way that, in reflection or transmission, in particular with the aid of a position code, a deflection-extent dependent projection of the deflection measurement radiation can be generated on the detector. By means of the deflection extent encoder, a corresponding angular position of the movable element or a translational deflection can be determined. This angular position or translational deflection can be provided for the corresponding determination of the spatial coordinates of a surface point.

According to one specific embodiment of the optical scanner, the deflection extent encoder can be a capacitive deflection extent encoder, wherein two opposing surfaces provide a measurement signal as measurable which changes in relation to the distance between the two opposing surfaces and the deflection extent is output based thereon, wherein one of these two opposing surfaces is arranged on the movable mirror. Similarly to the optical deflection extent encoder, the corresponding angular deflection or translational deflection can be provided for the determination of the spatial coordinates of a targeted surface point.

According to a further specific embodiment of the optical scanner, the deflection extent encoder can be an inductive deflection extent encoder having a measurement field in which a moving metallic object is detected, wherein a metallic object is arranged on the movable element and the measurement field covers a zero position of the movable element, so that as the movable element passes through the zero position, the metallic object is detected and the deflection extent is ascertained based thereon. Similarly to the optical and capacitive deflection extent encoders, the corresponding angular deflection or translational deflection can be provided for the determination of the spatial coordinates of a targeted surface point.

Independently of the type of the deflection extent encoder, the optical scanner can comprise at least parts of the deflection extent encoder as a structured coating.

In one specific embodiment of the beam manipulation system, the one-piece connection can be produced by means of an etching method, in particular a laser etching method.

An optical scanner can also comprise an emission channel for emitting at least a part of the distance measurement radiation/measurement radiation. The system for beam manipulation is then arranged in the emission channel in such a way that the direction of the emitted measurement radiation/distance measurement radiation can be changed over time. In this case, the system for beam manipulation is progressively, in particular continuously, activated via a control unit to progressively change the direction of the emitted measurement radiation/distance measurement radiation. The distance measurement radiation/measurement radiation can be deflected in this case in a field of view range of the optical scanner, which is defined by the maximum and minimum deflection of the movable element of the beam manipulation system and is vertical in particular. The control unit can also be configured to acquire measurement signals of a deflection extent encoder. Furthermore, such a scanner can also comprise a reception channel having a receiver, which is configured to receive at least a part of measurement radiation/distance measurement radiation reflected from the targeted geodetic target point or the surface point and to acquire a distance measurement signal based on the measurement radiation/distance measurement radiation. The detector is then part of the receiver. Furthermore, an optical scanner can also comprise a processing unit, which is designed to ascertain distance measurement data and coordinate information based on the acquired distance measurement signal and on the deflection extent.

A total station or a theodolite comprising an embodiment of the opto-electro-mechanical beam manipulation system according to the invention can comprise a radiation source for generating and emitting targeting radiation as measurement radiation, a rough targeting functionality and a fine targeting functionality and having a rough targeting field of view range and a fine targeting field of view range for the rough and fine alignment of the surveying device with a corresponding geodetic target point. In this case, in the scope of the rough targeting functionality, the surveying device is aligned with the geodetic target point by the targeting radiation being deflected using an embodiment of the opto-electro-mechanical beam manipulation system according to the invention in the vertical rough targeting field of view range. In the scope of the fine targeting functionality, in this case the surveying device is aligned with the geodetic target point by the targeting radiation being deflected using an embodiment of the opto-electro-mechanical beam deflection system according to the invention in the vertical fine targeting field of view range.

BRIEF DESCRIPTION OF THE DRAWINGS

The opto-electro-mechanical beam manipulation system according to some embodiments of the invention will be described in greater detail solely by way of example hereafter on the basis of a specific exemplary embodiment schematically illustrated in the drawings, wherein further advantages of the invention will be discussed. In detail, in the figures.

DETAILED DESCRIPTION

Figure 1:
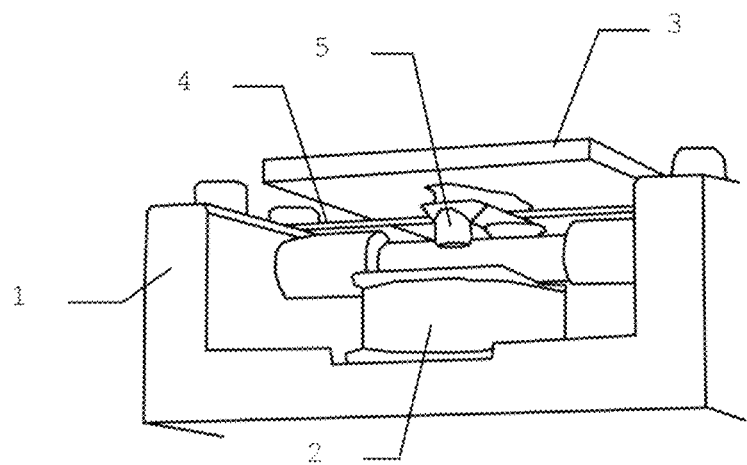
FIG. 1 shows an embodiment of an opto-electro-mechanical beam deflection system according to the prior art.

FIG. 1 shows an embodiment of an opto-electro-mechanical system for beam deflection according to the prior art. The system comprises a stator (1), on which a coil is fastened as an actuator element (2). A rotationally movable element (3) is adhesively bonded on a rod-shaped torsion spring element (4) defining a torsion axis/rotation axis, wherein the torsion spring element is fixedly connected to the stator at both ends and provides the rotational mobility of the element (3). The adhesive point which bonds the movable element to the torsion spring element also fixes the further actuator element (5), in the form of a permanent magnet here, and also a second permanent magnet, wherein the second permanent is used for measuring and regulating the frequency. The recess of the stator is arranged around the movable element in this case in such a way that it does not restrict the rotational deflection. By means of application of a current changing with time to the coil, a magnetic field changing with time is generated, whereby the actuator element formed as a permanent magnet is excited and the movable element is deflected.

Such a beam deflection system offers the advantage that the movable element can be designed flexibly with respect to its surface size and the shape. The complex assembly of the individual components is disadvantageous. The adhesive bond for fixing the movable elements and the actuator element makes it more difficult to achieve high reproducibility with respect to the functionality of assembled beam deflection systems. Corresponding variations are compensated for by complex calibration methods. Because of the bonding of different materials of which the respective components consist, in particular the spring element and the movable element, and the bonds, thermal tensions arise in the event of corresponding temperature changes, which result in errors in the beam deflection. Moreover, it is not possible to have optical radiation be incident on both sides on a movable element thus fastened or to have incident radiation exit again on both sides.

Figure 2:
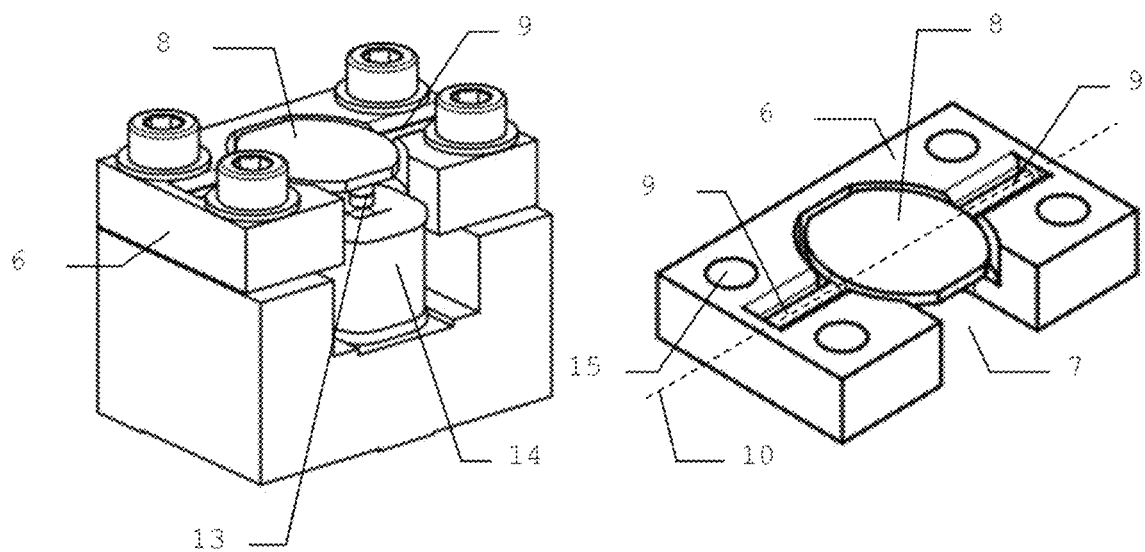
FIG. 2 shows an opto-electro-mechanical system for beam manipulation according to the invention.

FIG. 2 shows an exemplary embodiment of an opto-electro-mechanical system for beam manipulation according to the invention. The receptacle which fixes the actuator element (14), formed as a coil, in a defined position is fixedly connected to the stator (6) by means of screw connections. The stator is connected in one piece in this case to the movable element (8) via a flexible connection (9) providing a rotational mobility, wherein the composite consists of quartz glass. The connection defines the rotation axis or torsion axis (10), respectively, in this case. The recess is arranged around the movable element in such a way that it does not restrict the deflection (11, 11') of the movable element. The one-piece connection can be produced using a method similar to a 3D-printing process based on the local modification of regions of a quartz glass blank by means of focused laser radiation and subsequent chemical etching away of the glass regions previously subjected to the focused laser radiation. The actuator element (13) is formed as a permanent magnet and is fastened on the movable element. By means of application of a current which changes with time to the coil, a magnetic field changing with time is generated, whereby the actuator element (13) is excited and the movable element is deflected, wherein the connection elastically deforms under torsion. The connection cross section of the rod-shaped connection is circular in this case and does not have peaks or corners. A homogeneous distribution of the mechanical tensions in the connection volume is thus achieved under load.

Figure 3:
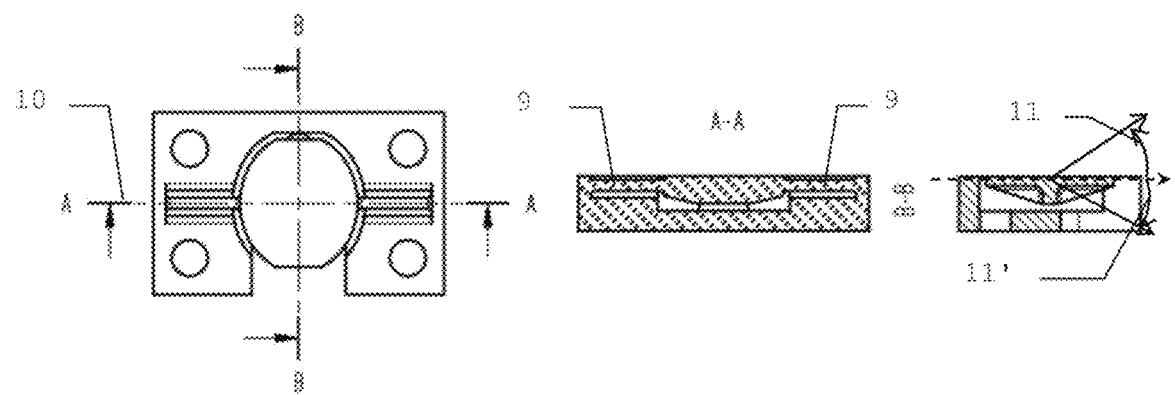
FIG. 3 shows sectional illustrations of the beam manipulation system according to the invention shown in FIG. 2.

Such an embodiment of the beam deflection system according to the invention offers the advantage of high thermal stability because of the one-piece connection of movable element and stator. The thermal stability is to be attributed in this case to the low coefficients of thermal expansion, which are homogeneous over the one-piece connection, of quartz glass and in particular to the condition that the flexible connection has the same coefficient of thermal expansion as the movable element. The flexible and gentle production method approximately enables the theoretical mechanical properties of quartz glass in the connection volume to be able to be used. The high rigidity in combination with the high yield stress and/or tensile strength of the connection enables high deflection dynamics in a large deflection range, above all in the case of resonant deflection, during which the movable element oscillates resonantly around the zero position. A resonant deflection is advantageous because of the low energy which has to be applied for the deflection and because of the speed at which a corresponding deflection range can be traveled. A resonant deflection is also advantageous at the highest possible resonant frequency, wherein a corresponding resonant frequency is determined by constructive features in combination with material-specific properties. Inter alia, the rigidity of the spring element, the tension distribution in the spring element during its elastic deformation, which is primarily defined via the shape of the spring element cross section, the mass distribution of the movable element in relation to the spring element, and the bond between the spring element and the movable element are decisive for the resonant frequency in the case of the resonant deflection. A beam manipulation system as shown in FIGS. 2 and 3 provides a system which is optimized over the prior art with respect to the factors influencing the resonant frequency. Therefore, because of the ability to adapt the individual system elements to one another, higher resonant frequencies may be achieved with reduced hysteresis effect at the same time.

More flexibility is achieved than in the prior art with respect to the surface size, shape, and functionality of the movable element, since the movable element may also be manufactured as an optical element, for example, as a beam shaping lens. It is thus also possible to have optical radiation pass through the movable element or optical element and to use the optical element in transmission for beam deflection. Furthermore, the surface of the movable element can also be prepared to receive a layer or layer sequence, which reflect optical radiation, by means of coating. Furthermore, the possibility would also remain of attaching an optical element to the movable element. The complex assembly steps are entirely dispensed with in the beam deflection system according to the invention.

Typical dimensions for a beam manipulation system as shown in FIGS. 2 and 3, relating to the movable element, are a surface size of 7×7 mm=49 mm$^2$, wherein the movable element can deflect or form an optical beam having a diameter of 5 mm.

In the exemplary embodiment, as shown in FIGS. 2 and 3, the movable element is connected to the stator via a flexible connection, which provides a rotational mobility. A flexible connection providing a translational mobility can also connect the movable element to the stator. Depending on the formation of the connection, the movable element can then have a translational and/or rotational mobility in up to 6 degrees of freedom. Depending on the number and type of the degrees of freedom, the mobility can be provided via a corresponding flexible connection (see FIG. 4; 16, 16', 16") between stator and movable element or via a design based on a gimballed mount. In this case, the same advantages apply with respect to the connection properties as in the case of the flexible connection providing a rotational mobility.

FIG. 3 shows sectional illustrations of the beam manipulation system according to the invention shown in FIG. 2. The torsion/rotation axis (10) is illustrated therein, which is defined by the flexible rod-shaped connection and around which the movable element can be deflected quasi-statically, dynamically, or resonantly.

Figure 4:
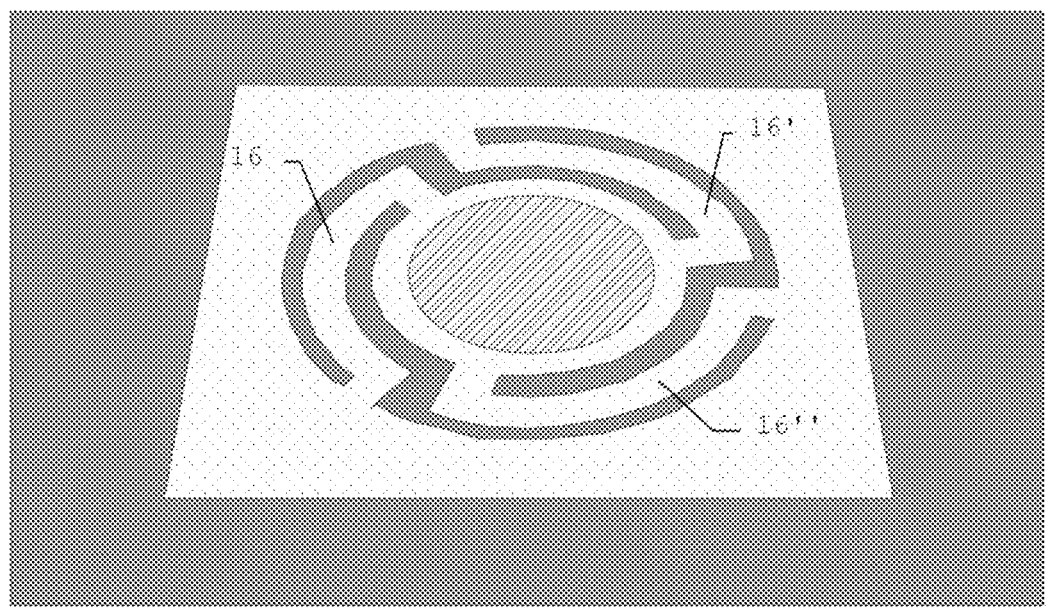
FIG. 4 shows a possible flexible connection between stator and movable element, which provides a rotational and translational mobility.

FIG. 4 shows solely by way of example a possible flexible connection (16, 16', 16") between stator and movable element, which simultaneously provides a rotational and translational deflection capability.

It is apparent that these illustrated figures only schematically illustrate possible exemplary embodiments. The various approaches can also be combined according to the invention with one another and with optical surveying devices or scanners of the prior art.

What is claimed is:

1. An optical scanner for surveying surfaces, the optical scanner comprising:
   a radiation source for emitting optical measurement radiation,
   an opto-electro-mechanical beam manipulation system comprising:

a rotationally or translationally movable element, wherein the movable element is itself an optical element or comprises an optical element;

a stator for the movable element having a recess enabling a deflection range;

a flexible connection disposed between the stator and the movable element providing a corresponding kinematically defined mobility, and an actuator for deflecting the movable element, wherein the stator is connected as one piece to the movable element, and the integral one-piece connection consists of silicate glass, and wherein the recess is arranged around the movable element in such a way that the movable element is deflectable in accordance with the kinematically defined mobility with elastic deformation of the connection by means of the actuator, and a detector for detecting at least parts of the measurement radiation reflected from the surface to be surveyed, wherein:

the opto-electro-mechanical beam manipulation system comprises a deflection extent encoder for determining the deflection extent of the movable element, and the optical measurement radiation is deflected by means of the opto-electro-mechanical beam manipulation system in the direction of the surface to be surveyed, so that the surface to be surveyed is scanned by the measurement radiation by means of the rotationally or translationally movable element in accordance with the kinematically defined mobility, and a part of the reflected measurement radiation is detected using the detector and the scanned surface is surveyed based thereon and on the determined deflection extent of the movable element.

2. The optical scanner according to claim 1, wherein the movable element for beam deflection comprises a mirror, or the movable element itself is a prism or a lens.

3. The optical scanner according to claim 1, wherein:

the flexible connection provides a rotational mobility, defines a torsion axis, is formed rod-shaped, and elastically deforms under torsion, and the actuator rotationally deflects the movable element in accordance with the kinematically defined mobility.

4. The optical scanner according to claim 2, wherein the opto-electro-mechanical beam manipulation system comprises:

an additional stator in relation to the one stator having a further recess enabling a further deflection range;

a further flexible connection, which provides a corresponding kinematically defined rotational mobility of the one stator, between the further stator and the one stator; and a further actuator for the rotational deflection of the one stator, in accordance with the kinematically defined mobility, with elastic deformation of the further connection, wherein:

the further stator is connected as one piece to the one stator and the one-piece connection consists of silicate glass, the further flexible connection for providing a kinematically defined rotational mobility of the one stator, a further torsion axis defined perpendicularly to the one torsion axis, is formed rod-shaped, and elastically deforms under torsion, so that the mobility of the movable element has two rotational degrees of freedom.

5. The optical scanner according to claim 2, wherein the rod-shaped flexible connection has a rounded rod cross section.

6. The optical scanner according to claim 1, further comprising:

an actuator comprises a first actuator element and a second actuator element which deflects the movable element based on an interaction of the actuator elements according to one of the action principles of:

electromagnetism, electrostatics, piezoelectricity, and thermoelectrics.

7. The optical scanner according to claim 1, wherein the first actuator element is a permanent magnet and the second actuator element is a coil.

8. The optical scanner according to claim 1, further comprising at least parts of an actuator element as a structured coating.

9. The optical scanner according to claim 1, further comprising a lens, a prism, or a mirror as a movable element, characterized in that a beam deflection capability or beam shaping capability is provided in accordance with a formation of the lens, the prism, or the mirror.

10. The optical scanner according to claim 9, wherein the lens is part of an Alvarez lens.

11. The optical scanner according to claim 1, wherein the deflection extent encoder is an optical deflection extent encoder having a radiation source, for emitting optical deflection measurement radiation, and a position-sensitive detector, in such a way that, in reflection or transmission a deflection-extent-dependent projection of the deflection measurement radiation can be generated on the detector.

12. The optical scanner according to claim 1, wherein the deflection extent encoder is a capacitive deflection extent encoder, wherein two opposing surfaces provide a measurement signal as measurable which changes in relation to the distance between the two opposing surfaces and the deflection extent is output based thereon, wherein one of these two opposing surfaces is arranged on the movable mirror.

13. The optical scanner according to claim 1, wherein the deflection extent encoder is an inductive deflection extent encoder having a measurement field in which a moving metallic object is detected, wherein a metallic object is arranged on the movable element and the measurement field covers a zero position of the movable element, so that as the movable element passes through the zero position, the metallic object is detected and the deflection extent is ascertained based thereon.

14. The optical scanner according to claim 1, wherein the one-piece connection is produced by means of an etching method.

* * * * *